Fig.1

May 19, 1953 G. DE PILLOT DE COLIGNY 2,639,384
METHOD AND DEVICE FOR FOCUSING OF RADIATIONS
BY MEANS OF STATIONARY REFLECTOR
AND REFRACTOR GRATINGS
Filed Dec. 2, 1949 9 Sheets-Sheet 3

Fig. 3

Inventor
Guerric De Pillot De Coligny
By Wenderoth, Lind & Ponack
attorneys May 19, 1953   G. DE PILLOT DE COLIGNY   2,639,384
METHOD AND DEVICE FOR FOCUSING OF RADIATIONS
BY MEANS OF STATIONARY REFLECTOR
AND REFRACTOR GRATINGS
Filed Dec. 2, 1949   9 Sheets-Sheet 4

Inventor
Guerric De Pillot De Coligny
By Wenderoth, Lind + Ponack
Attorneys

Inventor
Guerric De Pillot De Coligny
By Wenderoth, Lind & Ponack
Attorneys

May 19, 1953   G. DE PILLOT DE COLIGNY   2,639,384
METHOD AND DEVICE FOR FOCUSING OF RADIATIONS
BY MEANS OF STATIONARY REFLECTOR
AND REFRACTOR GRATINGS

Filed Dec. 2, 1949   9 Sheets-Sheet 7

Inventor
Guerric De Pillot De Coligny
By Wentworth, Lind & Ponack
attorneys

May 19, 1953  G. DE PILLOT DE COLIGNY  2,639,384
METHOD AND DEVICE FOR FOCUSING OF RADIATIONS
BY MEANS OF STATIONARY REFLECTOR
AND REFRACTOR GRATINGS
Filed Dec. 2, 1949  9 Sheets-Sheet 8

Inventor
Guerric De Pillot De Coligny
By Wenderoth, Lind & Ponack
Attorneys

Patented May 19, 1953

2,639,384

UNITED STATES PATENT OFFICE 2,639,384

METHOD AND DEVICE FOR FOCUSING OF RADIATIONS BY MEANS OF STATIONARY REFLECTOR AND REFRACTOR GRATINGS

Guerric de Pillot de Coligny, Versailles, France

Application December 2, 1949, Serial No. 130,814
In France December 4, 1948

6 Claims. (Cl. 250—33.65)

The present invention relates to radiation focusing devices and more particularly to radiation focusing devices comprising a driven primary radiator and a number of parasitic secondary radiators excited by the primary one.

It is known that the focusing of hertzian, optical or sonorous radiations can be obtained by electromagnetic or acoustic fields radiated by multiple parasitic secondary radiators, excited by a primary driven radiator, having a suitable geometrical arrangement with respect to one another and with respect to the primary one and being associated with each other through phase and amplitude relationships.

The gratings used, in particular, in optics and in radio, and which the present invention aims to improve, are systems which perform the focusing by composition of radiation fields between parasitic radiators having comparable amplitudes and having their phases related in an arithmetical series, the constant difference of this series being equal, for certain radiation directions, to the wavelength or to one of its integral multiples.

A great drawback of the focusing devices of the above type is the necessity of placing the primary driven radiator in one single position, the punctual focus or the linear focus and the narrower the focused beam must be made and the smaller the dimensions of the device as compared with the wavelength, the greater must be the accuracy of maintaining the primary radiator in this focus position.

On account of the necessity of accurately fixing the location of the primary radiator the focused beam cannot be displaced otherwise than by moving the whole focusing system. But this latter may have such inertia as to be prohibitive for keeping pace with a rapid oscillating motion.

The object of the present invention is to overcome this drawback by permitting small and short period oscillating displacements of the focused beam by moving the primary radiator alone, while the whole focusing system remains fixed, and without materially affecting the beam angle.

Another object of the present invention is to provide a new arrangement which permits the transmission of a constant-pattern scanning beam by means of a single moveable non-directional radiator cooperating with a single focusing device.

Another object of the present invention is to provide a new focusing device so constructed as to have a linear focus and a non-directional radiator movable along said linear focus and giving rise to a scanning radio beam, the sharpness of which is independent on the exact location of said radiator along the linear focus.

For the sake of clearness of the following disclosure, it is pointed out that in a small motion of a rigid or yielding surface, the term "characteristic line" denotes the contact line of this surface with its envelope surface. The line is called a "stationary" one, because the position of the portion of the movable surface in the vicinity of this line may be considered as being motionless, within an approximation neglecting terms of the second order. In the subsequent specification and claims the term "stationary characteristic line" will be used in this precise mathematical meaning.

The equation of this characteristic line may be obtained in the following manner:

Let us assume that in a system of rectangular coordinates $Ox_0y_0z_0$, $$S(x_0y_0z_0)=0 \tag{1}$$

is the equation of a solid surface. It is known according to a fundamental theorem of kinematics that any small motion of a solid may be reduced to a helical motion, i. e. to a rotation about an axis and to a translation parallel to the same axis. Let us take $Ox_0$ as said rotation and translation axis. Hence, if $x_0y_0z_0$ are the coordinates of a point of the solid surface at a given instant when $t=0$, at another instant $t$ the coordinates of this point will be:

$$x_t = x_0 + r\theta$$
$$y_t = y_0 \cos\theta - z_0 \sin\theta$$
$$z_t = y_0 \sin\theta + z_0 \cos\theta$$

These equations of transformation are equivalent to:

$$x_0 = x_t - r\theta$$
$$y_0 = -y_t \cos\theta + z_t \sin\theta$$
$$z_0 = -y_t \sin\theta + z_t \cos\theta$$

wherein $r$ is a constant value corresponding to the pitch of the elementary helical motion and $\theta$ is the angle of rotation. This angle $\theta$ is the only variable value of the equations and it varies in relationship with the time $t$ according to an arbitrary law determining the motion. In case of an oscillatory motion, this law is a periodic function of time, for instance a sinusoidal function:

$$\theta = \theta_0 \sin \omega t$$

Hence, for the time $t$, after rotation through an angle $\theta$ and translation of a distance $r\theta$, the solid surface will have the equation:

$$S_0(x_t - r\theta, y_t \cos \theta + z_t \sin \theta, -y_t \sin \theta + z_t \cos \theta) = 0 \quad (2)$$

or, $$S_1(x_t, y_t, z_t) = 0 \quad (3)$$

The stationary characteristic line of $S_1$ for $\theta = 0$ will be obtained by reducing to zero the partial derivative relative to $\theta$, i. e.:

$$-\frac{\delta S_1}{\delta \theta} = r\frac{\delta S_0}{\delta x} + (y \sin \theta - z \cos \theta)\frac{\delta S_0}{\delta y}$$
$$+ (y \cos \theta + z \sin \theta)\frac{\delta S_0}{\delta z} = 0$$

which becomes, for $\theta = 0$:

$$r\frac{\delta S_0}{\delta x} - z\frac{\delta S_0}{\delta y} + y\frac{\delta S_0}{\delta z} = 0 \quad (4)$$

(4) is the equation of a surface in the system of the rectangular coordinates $Oxyz$. The intersection of this surface with the surface represented by the Equation 1 determines the desired stationary characteristic line.

If the movable surface is a yielding surface instead of a solid surface, Equations 1, 2, 3 and 4 become respectively:

$$S_0(x_0 y_0 z_0, \theta = 0) = 0 \quad (1')$$

$$S_0(x_t - r\theta, y_t \cos \theta + z_t \sin \theta,$$
$$-y_t \sin \theta + z_t \cos \theta, \theta) = 0 \quad (2')$$

$$S_1(x_t, y_t, z_t, \theta) = 0 \quad (3')$$

$$r\frac{\delta S_0}{\delta x} - z\frac{\delta S_0}{\delta y} + y\frac{\delta S_0}{\delta z} - \left[\frac{\delta S_0}{\delta \theta}\right]_{=0} = 0 \quad (4')$$

The intersection of surface (1') with surface (4') determines the desired stationary characteristic line.

If, as is the case with the examples cited in the present application, the stationary characteristic lines are to be determined as involved in the same elementary motion and relative to a number of surfaces belonging to the same mathematical family and deriving from each other by discontinuous variations of a parameter P, it will not be necessary to use more than once the calculation leading to Equations 1 and 4, or to Equations 1' and 4'.

In a more general manner, if the parameter P, instead of varying in a discontinuous manner, be a continuous function of $\theta$, and since only restricted motions about the value of $\theta = 0$ are contemplated, it will be noted that P may be developed in terms of $\theta$ by applying MacLaurin formula restricted to members of the first order, viz.:

$$P = a(K) + b(K) \cdot \theta$$

wherein K is the order number of a surface of the family.

The Equation 1' becomes then:

$$S(x_0, y_0, z_0, P(K, \theta=0), \theta=0) = 0 \quad (5)$$

whereas the Equation 4' passes into:

$$r\frac{\delta S}{\delta x} - z\frac{\delta S}{\delta y} + y\frac{\delta S}{\delta z} - \frac{\delta S}{\delta \theta_{=0}} - \frac{\delta S}{\delta P}\cdot\frac{\delta P}{\delta \theta_{=0}} = 0 \quad (6)$$

For the same value of K the Equations 5 and 6 determine one stationary characteristic line amongst a plurality of characteristic lines, each traced upon a surface of the family of surfaces involved in the same small motion.

The method of focusing according to the invention consists essentially in arranging the components of the grating formed by parasitic secondary radiators excited by one single primary driven radiator, said primary radiator being carried into a small motion for producing a scanning beam, along the stationary characteristic lines, corresponding with this motion, of a family of virtual focusing surfaces having a common focus and possessing common and equiphase wavefronts, as explained below.

These surfaces are called "virtual surfaces" because it is to be understood that the remainder of the surfaces do not exist in reality, but instead are imaginative projected structures which have been set forth herein for purpose of explanation. Each of the surfaces of the family is restricted to a strip located along its stationary characteristic line.

The surfaces of the family have common and equiphase wavefronts, i. e. the electric distances traversed by the waves emitted by the primary radiator, when reflected or refracted by the several surfaces, differ by integral wavelengths or by multiples of wavelengths.

The trajectory traversed by the primary radiator in its small movement is the linear focus of the grating. All the normals to the surface portions constituting the grating components meet the translation and rotation axis. If we trace the incident radiation rays joining the primary radiator, which is at the common focus of all the focusing surfaces, to the grating components and also the emergent radiation rays and if we rotate as a whole the system comprising the primary radiator and the grating components through a small angle about the translation and rotation axis, this rotation involves an equal variation of all the angles between the incident rays and the normals. Consequently, if the emergent radiation rays were for example parallel with each other, they remain parallel.

The virtual focusing surfaces may be constituted either by reflectors or refractors.

The focusing surfaces are physically defined by the desired focusing property.

For example, with a reflector, if a point-to-point or spherical-spherical wavefront focusing is desired, the two points being at finite distances, the surfaces are ellipsoids of revolution having these two points as foci.

On the other hand, with a refractor, if a point-to-point focusing is desired, the two points being once more at finite distances, the surfaces are surfaces of revolution generated by Cartesian ovals (i. e. the locus of the points, the distances of which to two circles, are in a constant ratio to each other).

With a reflector, if a point-to-point focusing is desired, one point being at finite distance and the other point at infinite distance, i. e. a spherical-plane wavefront focusing, the surfaces are paraboloids of revolution.

With a reflector, if a point-to-straight line focusing is desired, the point being located at finite distance and the straight line at an infinite distance, the surfaces are parabolic cylinders.

The radiations which are to be focused may be of any wave nature, whether they are acoustic or electromagnetic ones, and therefore the driven primary radiator may be of a sonorous, optic or hertizian character.

Moreover, the virtual focusing surfaces, the stationary characteristic lines of which form the components of the focusing grating, may be deformable in accordance with the angle of elementary rotation. The only condition to comply with is that the spacing between various surfaces comprised in the family of the focusing surfaces be such that the wavefronts be in equiphase relationship with each other.

To clarify the relationship between the present application and my copending application filed on the 28th of December 1949, Ser. No. 135,482, it should be noticed that the focusing device constituted by the sets of elementary surfaces cut out from the virtual focusing surfaces along the stationary characteristic lines is in the present case associated with a primary radiator having an oscillatory motion along its linear focus while in the copending case it is associated with a plurality of primary radiators fixed with respect to and disposed along said linear focus.

The focusing devices will be described in detail as applied to the cases where the beam, which is to be rendered movable, is a hertzian beam of a very short wavelength equal to 3.2 cm. where the desired focusing is a spherical-plane wavefront focusing and where the focusing surfaces are in one case reflecting ones and in the other case refracting ones.

It is understood however that the following are examples of some embodiments only and the invention is not limited thereto, and that focusing devices according to the invention could be designed in other cases of focusing, for example, in the case of a convergent, i. e. spherical-spherical wavefront focusing.

The motions of the beams chosen as examples will be, on the one hand, a plane oscillatory scanning of a small angular amplitude of the so-called lobe switching type and, on the other hand, a spiral scanning about a point of the type used in automatic tracking centimeter radars. The first example will be dealt with in accordance to two hypotheses: firstly in case of a real primary antenna; and secondly, in case of a virtual primary antenna which is a mirror image of a real antenna.

The detailed description is to be taken with reference to the accompanying drawings in which:

Figs. 4, 5, 6 and 7 show a reflector grating antenna useable in the case of Fig. 1.

Figs. 8 and 9 show an antenna useable in the case of Fig. 2.

Figs. 10 and 11 show an antenna useable in the case of Fig. 3.

Figs. 12 and 13 show an antenna useable in the case of Fig. 3, but adapted for a spiral scanning about a point, for use in an automatic tracking radar: Fig. 14 is a front elevation.

Figs. 14, 15 and 16 show an antenna for the case of Fig. 3, but having a virtual primary antenna which is a mirror image of the real antenna.

Figure 1:
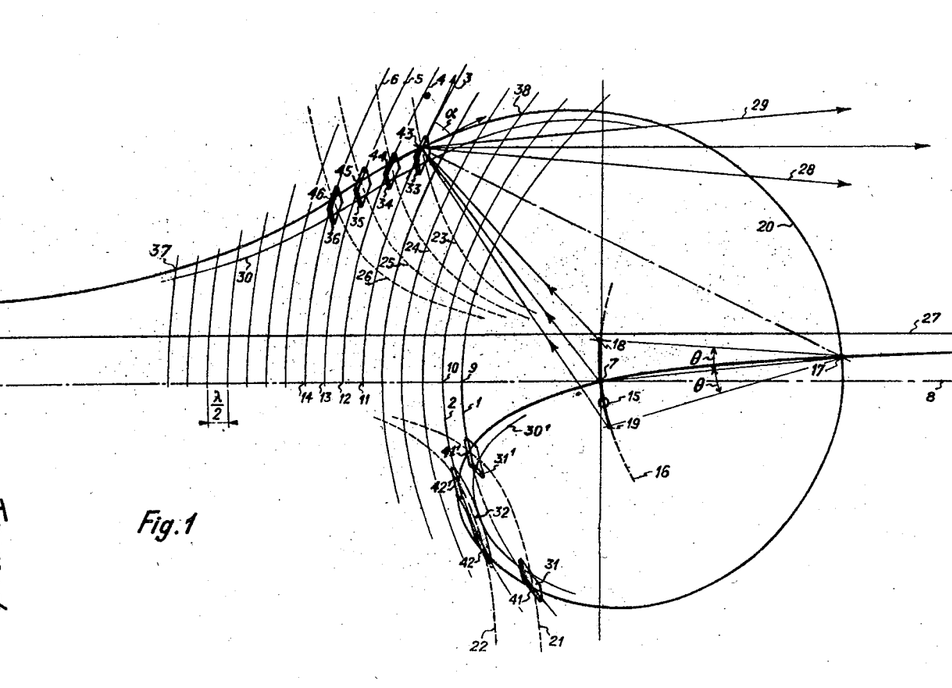
Fig. 1 illustrates the case where the focusing surfaces are paraboloids of revolution and where the axis of oscillatory motion of the primary radiator, perpendicular to the axis of revolution, is located at a small distance from the latter.
Figure 2:
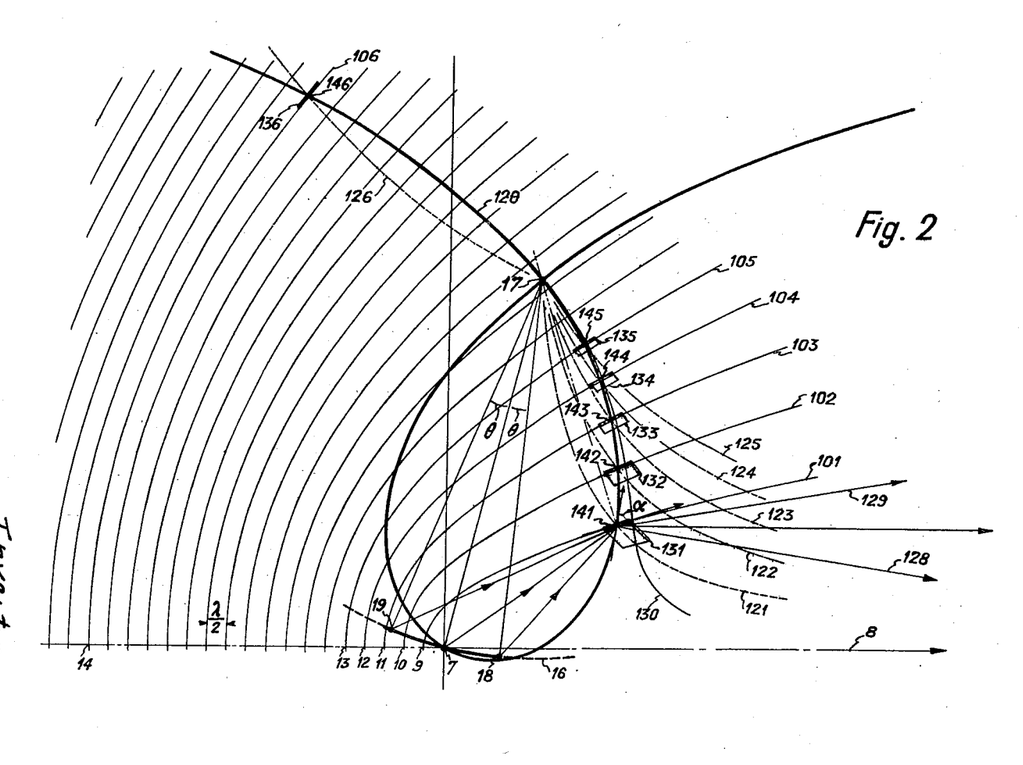
Fig. 2 illustrates the case where the distance from the axis of the primary radiator oscillatory motion to the axis of revolution is greater.
Figure 3:
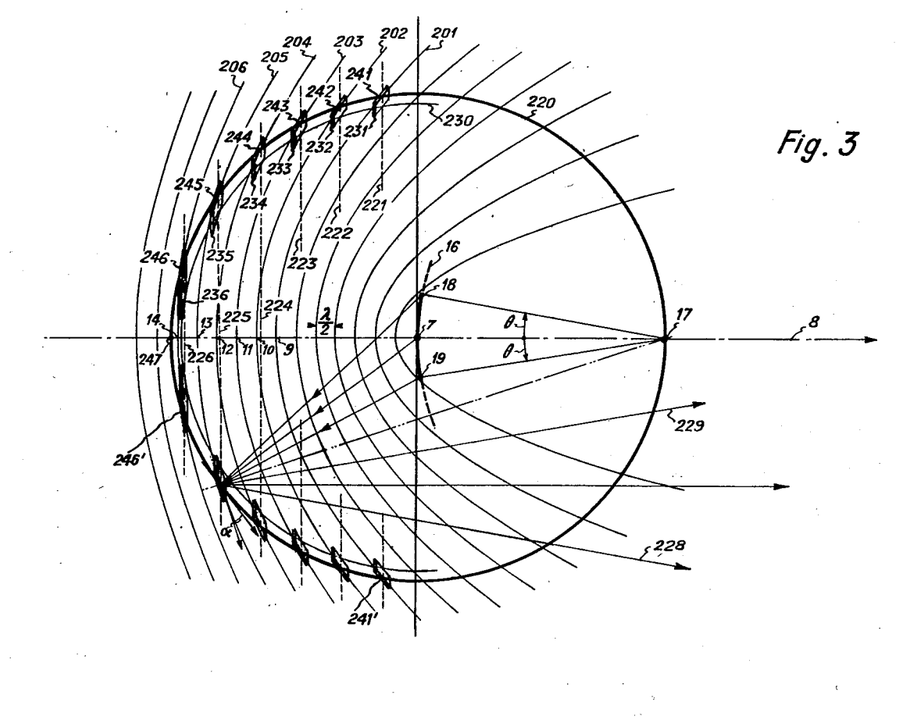
Fig. 3 illustrates the case where the axis of oscillatory motion meets the axis of revolution.

Referring now to Figs. 1, 2 and 3 the scanning is a plane alternating scanning and the scanning plane of the beam is taken as the plane of the figures. This plane is also the symmetry plane of the whole system, and it will be called "vertical" (which is the case of an elevation scanning). The mean direction 8 of the beam will be denoted as "horizontal," and the direction of propagation of the beam is taken from the left to the right in the three figures.

The primary radiator 15 radiates electromagnetic energy the electric field of which is perpendicular to the figure plane.

This radiator rotates about the axis 17, perpendicular to the figure plane. In Figure 1, 17 is located slightly above the axis 8, in Figure 2, 17 is very much higher above the axis 8, finally, in Figure 3, 17 cuts the axis 8.

The radiator 15, in its elementary oscillating rotation about 17, traces an arc 18—19 of a circle 16. It has been assumed for all the three figures that the amplitude of the angular scanning is 20°, i. e.:

$$2\theta = \widehat{18\text{-}17\text{-}19} = 20°$$

In Figure 1, 1, 2, 3, 4, 5 and 6 are paraboloids of revolution having a common focus 7, a common axis 8 and vertexes 9, 10, 11, 12, 13, 14 ... the mutual distances between which are equal to $$K\frac{\lambda}{2}$$

wherein K is an integer and $\lambda$ the wavelength of the primary radiator. In Fig. 2, the paraboloids of revolution are indicated by reference numerals 101, 102, 103, 104, 105 and 106 and in Fig. 3, they are indicated by reference numerals 201, 202, 203, 204, 205 and 206.

This primary radiator 15 is actuated by an alternating rotating movement of small amplitude along the circle 16 passing through the common focus 7 and having its center on the axis 17.

If we assume that the paraboloids 1–6 or 101–106 or 201–206 are actuated by the same oscillating movement about the axis 17 as in the case of the primary radiator 15, then each of these paraboloids possesses a surface envelope and touches this envelope following the stationary characteristic line of contact. The stationary characteristic line of the paraboloid may be readily obtained by drawing perpendiculars from point 17 to the paraboloids or determined from the mathematical analysis as afore set forth.

In fact, if a system of rectangular coordinates originating in 7 and having its x-axis perpendicular to the plane of Figures 1, 2 and 3 and its y-axis directed along the common focal axis 8 is taken as a reference system, the equation of the first paraboloid having its focus in 7 and a focal distance to the vertex equal to $d$, will be as follows:

$$x^2 - 4d(y+d) + z^2 = 0$$

The equations of other paraboloids of the same family (common focus, axis and orientation, but the mutual distance between vertexes equal to $\lambda/2$) will be deduced from the former one by substituting $d + K\lambda/2$ for $d$:

$$x^2 - 4(K\lambda/2 + d)(y + K\lambda/2 + d) + z^2 = 0$$

If the origin of the rectangular coordinates is moved from the point 7, to the point 17, and if in the original system the coordinates of the point 17, are $y=m$ and $z=n$, the equation of the family of paraboloids becomes:

$$S = x^2 - 4(K\lambda/2+d)(y+m+K\lambda/2+d) + (z+n)^2 = 0 \quad (7)$$

P of Equation 5 is here represented by $K\lambda/2+d$ and it is independent on $\theta$. On the other hand, the elementary motion being a simple rotation about an axis, $r$ of Equation 6 is equal to zero; whence:

$$\frac{\delta S}{\delta x} = 2x \quad \frac{\delta S}{\delta y} = -4(K\lambda/2+d) \quad \frac{\delta S}{\delta z} = 2(z+n)$$

$$\frac{\delta S}{\delta \theta} = 0 \quad \frac{\delta S}{\delta P} = -8(K\lambda/2+d) - 4(y+m) \quad \frac{\delta P}{\delta \theta} = 0$$

and Equation 6 becomes:

$$4z(K\lambda/2+d) + 2y(z+n) = 0 \quad (8)$$

or:

$$y(z+n) + 2z(K\lambda/2+d) = 0 \quad (8')$$

If, instead of taking $P=K\lambda/2+d$ independent on $\theta$, the value of P were taken as:

$$P = K\lambda/2 + p\theta + q$$

$p\theta+q$ being a limited MacLaurin development of any function of $\theta$, instead of Equation 8' the following equation would be obtained:

$$y(z+n) + 2(K\lambda/2+p\theta+q)z + 2p[2(K\lambda/2+p\theta+q)+y+m] = 0$$

Coming back to P when independent on $\theta$, for each value on K the Equations 7 and 8' determine a characteristic line. It will be noted that since the coordinate $x$ does not appear in Equation 8', this latter also represents the projections of the various characteristic lines on the plane $yz$, i. e. on the plane of Figures 1, 2 and 3. This equation represents a family of hyperbolic cylinders the intersection of which by the plane $yz$ is a family of equilateral hyperbolae (for $n \neq 0$) all passing through the point 17 ($y=z=0$) and all having as their asymptote the axis 8 given by the equation $z=-n$.

But in the particular case of Figure 3:

$$n = 0$$

and the Equation 8' becomes:

$$yz + 2z(K\lambda/2+d) = 0 \quad (8'')$$

which resolves into:

$$z = 0 \text{ (worthless)}$$

and $$y = -2(K\lambda/2+d)$$

which represents a family of planes, the intersection of which by the plane $yz$ is a family of straight lines.

If one wishes to obtain the locus of the intersection points of the meridian parabolae of the paraboloids and of the equilateral hyperbolae, it will suffice to eliminate $K\lambda/2+d$ between the Equations 7 and 8' and to make $x=0$ in the equation resulting from this elimination. It will be found:

$$(y^2+z^2)z - ny^2 + 2myz + nz^2 = 0$$

which is the equation of a strophoid having a double point in 17, passing through the focus 7 ($y=-m$, $z=-n$) and having as asymptote the straight line 27, $z=n$ symmetrical to the axis of revolution 8 with respect to 17.

In Fig. 1, 21, 22, 23, 24, 25, 26 indicate the equilateral hyperbolae, 41, 41¹, 42, 42¹, 43, 44, 45, 46 the respective points of intersection of the meridian parabolae 1, 2, 3, 4, 5, 6 and of the hyperbolae 21, 22, 23, 24, 25, 26. Said intersection points are distributed along the strophoid 20.

Along each curve 21—26 respectively traced upon a paraboloid of the family, and which is the intersection of said paraboloid by the perbolic cylinder defining the characteristic curve, is disposed a narrow metal strip, respectively 31—36 which is a portion of said paraboloid.

The strips are limited by two planes parallel to the figure plane and separated from the same by $\pm 30$ to $\pm 60$ cms., according to the desired beam width in the plane perpendicular to the figure plane: $\pm 30$ cms. for about 3°; $\pm 60$ cms. for about 1.5°. In this latter case, the points at which the various strips cut the limiting planes are aligned along the curve 30—30¹.

In Fig. 2, 121, 122, 123, 124, 125, 126 indicate the equilateral hyperbolae, 141, 142, 143, 144, 145, 146 the respective points of intersection of the meridian parabolae 101, 102, 103, 104, 105, 106 and of the hyperbolae 121, 122, 123, 124, 125, 126. Said intersection points are distributed along the strophoid 120. Along each curve 121—126 traced upon the paraboloids 101—106 are disposed narrow metal strips 131—136 which are portions of said paraboloids. These strips are limited as in the case of Fig. 1 and the limiting points are aligned along the curve 130. To the left of point 17, the projections on the plane of the figure of curve 120 and of curve 130 practically merge.

In Fig. 3, the equilateral hyperbolae are degenerated into straight lines 221, 222, 223, 224, 225, 226. The points of intersection 241—246 of the meridian parabolae 201—206 and of the straight lines 221—226 are distributed along the circle 220 having point 7 as its center and passing through 17. Strips 231—236 are portions of paraboloids cut along the cross-sections of said paraboloids formed by the planes which are projected on the plane of the figure as straight segments 221—226. The points at which the various strips cut the limiting planes parallel to the figure plane are aligned along the circle 230. It is to be noticed that all the tangents to the meridian parabolae at points 241—246 pass through point 247 symmetrical to 17 with respect to 7 since all the normals at said points pass through point 17.

The working of the reflector grating devices is as follows:

If each paraboloid of Figures 1, 2 and 3 was completely developed, it would yield the desired result i. e. a constant angle scanning beam provided that it followed the primary radiator 15 in its motion about 17. But if the development is restricted to a very narrow strip of the surface (10 mm. wide) along its characteristic line, this elementary reflector may be maintained fixed since in its motion the paraboloid continues to pass through this line.

To balance the effect, both in magnitude and in the angular aperture in the plane of the figure, of the extreme restriction of the width of this reflecting surface, this surface is repeated a sufficient number of times (for instance 200 times) using other paraboloids giving an equiphase beam with the former.

Figures 4 to 7 illustrate an antenna derived from the curves of Figure 1. In this antenna the reflector grating device is constituted by strips forming the characteristic curves bordering the strophoid 20 between the points 37 and 38, on the one hand, and between the points 41 and 41' on the other hand (Figure 1).

Figures 4, 5, 6, 7:
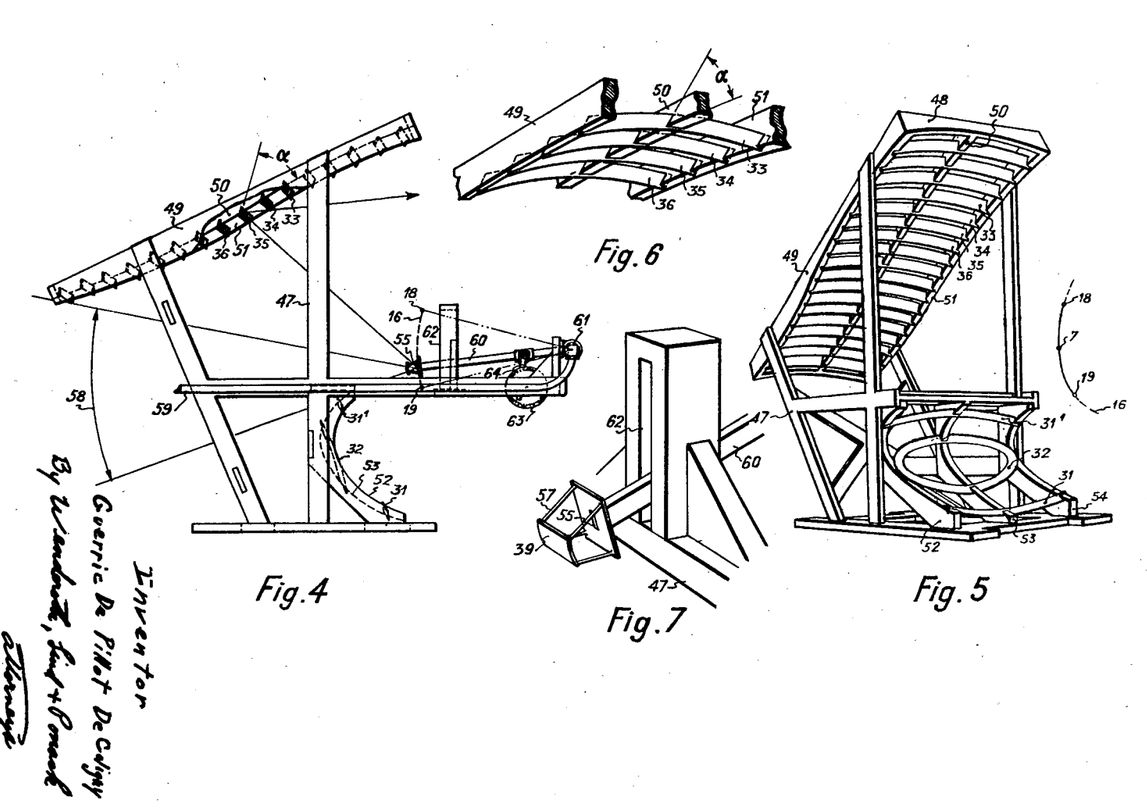
Fig. 4 is a side view.
Fig. 5 is a perspective view.
Figs. 6 and 7 enlarged structural details.

Strips 31, 31', 32, 33, 34, 35, 36 cut out along the stationary characteristic curves are supported, with a desired slanting (the angle a of Figure 4 and of Figure 6 is equal to the angle a of Figure 1 between the tangents to the strophoid and to the meridian parabolae) by a framework 47 of nonconducting material comprising cross pieces 48 and mounting members 49, 50, 51 and 52, 53, 54 likewise made of wood. Central mounts 50 and 53 are formed in the profile of strophoid 20 in the region comprised between points 37 and 38 for the mounting member 50 and in the region of points 41, 42, 42' and 41' for the mounting member 53. The lateral mounting members 49 and 51 have the profile of curve 30 and the lateral mounting members 52 and 54 have the profile of curve 30'. The strips, reduced in number to 6 for simplifying the explanation of the device, are in practice considerably enlarged in number. They may have any thickness, for instance 1 mm., and, for example, a width of 10 mm. and a length of some 0.60 to 1.20 meters.

The upper strips are placed about every two centimeter apart along a surface extending from about 3.50 meters back of the primary antenna and 0.80 meter above the latter, and to about 0.80 meter backwards and 2.20 meters above the primary antenna.

The lower strip 32 forms one single loop strip.

Neither the nature of the primary antenna 15, nor the means of setting it in motion and of articulating the same are specific to the present invention. Figs. 4 and 7 illustrate a slot antenna 55 provided, by means of members 57, with a reflector screen 39 so as to avoid radiations in the angular space 58 having no reflecting strips. 59 is the feed wave guide, 60 a movable wave guide and 61 a rotating joint. The extremity of wave guide 60 carrying the slot antenna is guided by a slideway 62 and is put into oscillatory motion by means of wheel 63 and connecting rod 64. The antenna will thus trace an arc of circle 18—19.

Figure 8:
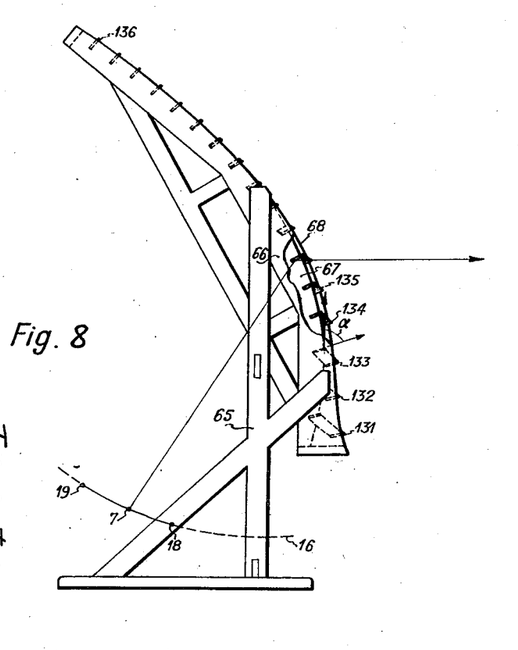
Fig. 8 is a side view and Fig. 9 is a front elevation.
Figure 9:
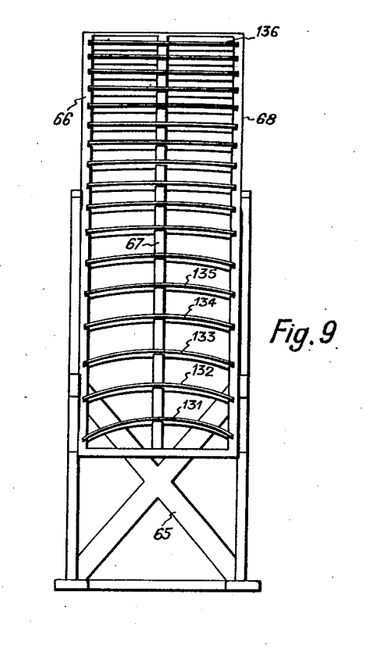

Figs. 8 and 9 show an antenna derived from the curves of Figure 2. In this antenna the reflector device is constituted by strips 131—136 disposed along the characteristic curves which cut the planes of Fig. 2 at points aligned along the portion of strophoid 120 limited by the points 141 and 146. 65 is a frame, 66, 67, 68 are the supporting wooden slats. The middle one 67 has a longitudinal profile corresponding to the strophoid 120 of Fig. 2, and the outside edge slats 66 and 68 have a longitudinal profile corresponding to the curve 130. The nature and the manner of articulation of the primary radiator 15 are not shown; they can be the same as in Figs. 4 and 7, with the exception however, of the reflector screen, since in the present case there is no angular space unprovided with reflecting strips.

Figure 10:
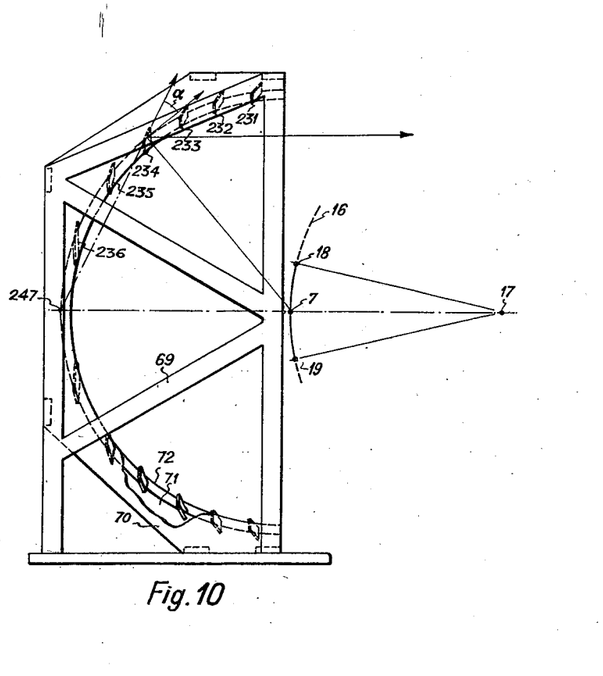
Fig. 10 is a side view.
Figure 11:
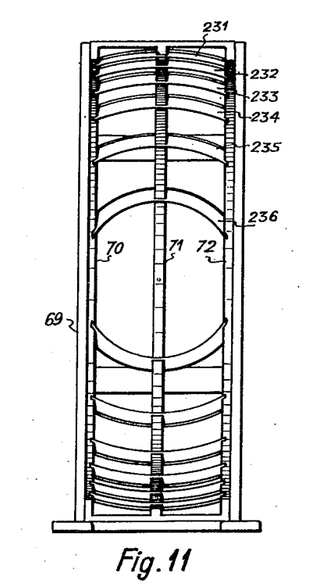
Fig. 11 is a front elevation.

Figs. 10 and 11 show an antenna derived from the curves of Figure 3. In this antenna the reflector device is constituted by strips 231—236 disposed along the circular characteristic curves bordering the circle 220 between the points 241 and 246 and the points 241' and 246'. 69 is a frame, 70, 71, 72 are the supporting wooden slats. The middle one 71 has the circular profile of circle 220 of Fig. 3 and the outside edge slats 70 and 72 have the circular profile of circle 230. As, in this case, the cones tangent to the paraboloids along the characteristic lines are cones of revolution having a common vertex at 247 and since the strips which are very narrow may be assimilated with said tangent cones, each strip is here a flat frustum.

Figure 12:
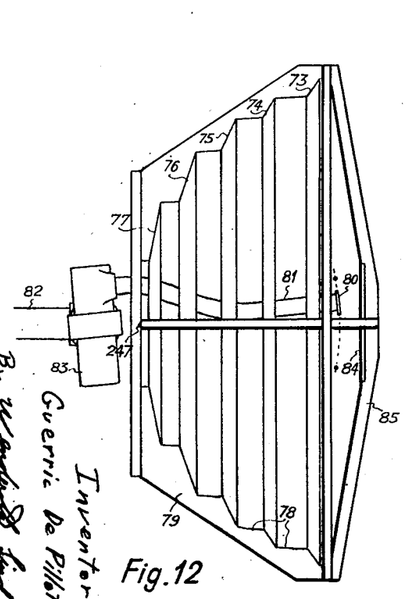
Fig. 12 is a side.
Figure 13:
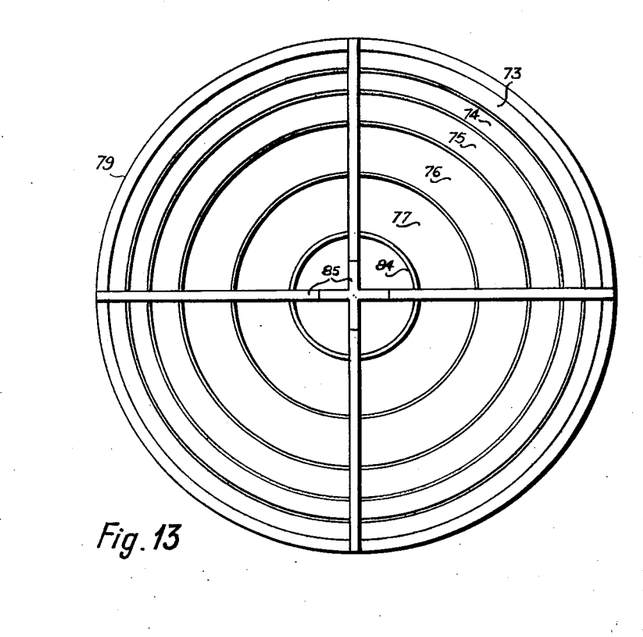

Figs. 12 and 13 show an antenna also derived from the curves of Fig. 3, but the scanning of the beam is no longer an oscillatory one, but spiral. A system of spiral sweeping suitable for this embodiment is shown in AN16–30APS6–3 Handbook of Maintenance Instructions for AN/APS–6A–AN/APS–6 Aircraft Radar Equipments Approved February 15, 1945, Revised April 15, 1946.

In Fig. 12 all the reflecting strips are shown (wavelength 3.2 cm.). There are five strips shown in 73, 74, 75, 76, 77. As above they are flat cone frusta, all these frusta converging if prolonged to the point 247 symmetrical with 17 with respect to 7. It is to be noted that the larger base of each frustum has a diameter somewhat smaller than that of the smaller base of the next frustum, in the order of increasing diameters; in other words, the edge portion 78 of the supporting wooden slats 79 is not parallel to the reflector's axis, but is slightly convergent with respect to this axis, so as to avoid having the strips mutually shadowed.

The primary radiator 80 which is the open end of a rectangular wave guide 81 follows a spiral curve upon being actuated by a mechanism not shown. The mobile wave guide 81 is articulated about another fixed guide 82 through an universal rotating joint 83. The wave guide mouth 80 is open in front of a plane mirror 84 held in place before the reflecting device by a counter-bracket 85. This device operates as if the primary radiator were the image of 80 in the plane mirror 84.

Figure 14:
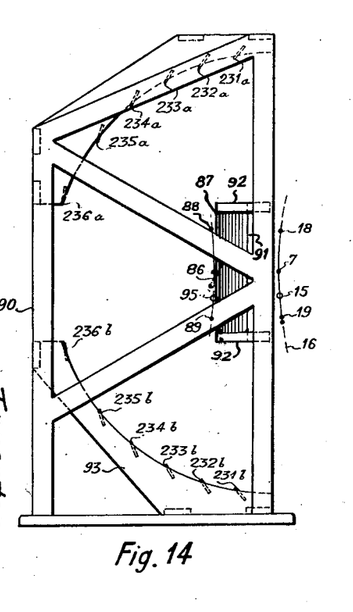
Fig. 14 is a side view.
Figure 15:
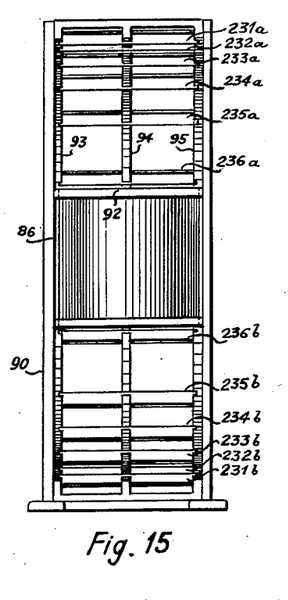
Fig. 15 is a front elevation.
Figure 16:
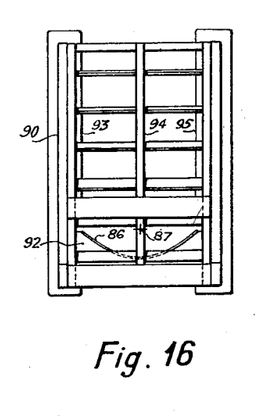
Fig. 16 is a top plan view.

Figs. 14, 15 and 16 show an antenna derived from the curves of Fig. 3 and in which the reflecting strips are straight ones, contrary to the antennae described above where the strips were curved.

This antenna comprises a combination of a parabolic cylindrical mirror 86 with a strip reflector device. The portion 18—19 of circle 16 is the linear focus of the reflector device. As the antenna has two linear foci, namely the focal line of the parabolic cylinder 86 and the focal line 18—19, it has a focal plane defined by these two lines. The parabolic cylinder 86, concave backwards, has its symmetry plane located in the plane of Figure 14: its focal axis 87 and its vertex line 91 are two straight lines parallel to the linear focus 18—19 and line 87 is a symmetric of said linear focus with respect to vertex line 91. A primary radiator 95 is movable along focal axis 87 and the radiation beam, coming from 95 and reflected by mirror 86, may be regarded as coming directly from a virtual radiator 15 located along linear focus 18—19. By assimilating focal axis 87 with the symmetric 88—89 of linear focus 18—19 with respect to vertex line 91, real radiator 95 is equivalent to virtual radiator 15.

The parabolic cylinder 86 is fastened to the frame 90 by means of slats 92, for instance made of wood. 93, 94 and 96 are wooden supporting slats having the circular profile of circle 220 of Fig. 3. 231a to 236a and 231b to 236b are reflecting strips shown edgewise in Figure 14. In this embodiment the primary radiator is the image of the real source in the parabolic-cylindrical mirror. This mirror focuses the spherical wavefront radiation emitted by 95 into a beam having a small angle in the plane perpendicular to that of the figure, the aperture of the parabolic cylinder determining the width of the beam in this plane (±30 cm. for 3°; ±60 cm. for 1.5°), but largely divergent in the plane of Fig. 14. The reflector grating according to the invention focuses the radiation rays in the plane of the figure.

Figure 17:
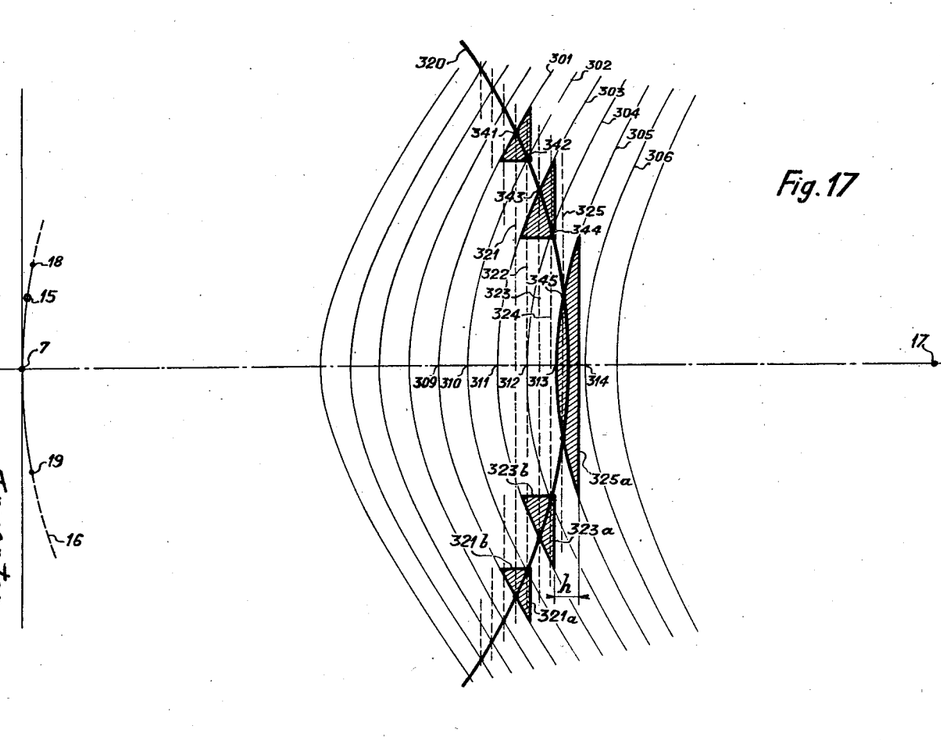
Fig. 17 illustrates the case of a refractor grating antenna.

In the case of refraction through a diopter separating a medium of refractive index 1 from a medium of refractive index $\nu$, if it is desired to focus a spherical front wave emitted by a primary radiator located at 7 in the medium of index 1 into a plane front wave in the medium of index $\nu$, the diopter surface is an hyperboloid of revolution having point 7 as focus and the equation of which is a system of rectangular coordinates originating in 7 and having its $x$-axis perpendicular to the plane of Fig. 17 and its $y$-axis directed along the axis of revolution of the hyperboloid, is:

$$x^2+y^2+z^2-(\nu y-d)^2=0$$

wherein $$\frac{d}{\nu-1}$$

is the distance between focus 7 and vertex 309 of hyperboloid 301 (Fig. 17).

The equations of the other hyperboloids 302—306 of the same family (common focus, axis and orientation but mutual distances between vertexes 309—314 equal to $$\frac{K\lambda}{\nu-1}$$

(in Fig. 17, $K=1$) will be deduced from the former by substituting $d+K\lambda$ for $d$:

$$x^2+y^2+z^2-(\nu y-d-K\lambda)^2=0$$

If the origin of the rectangular coordinates is moved from the point 7 to the point 17 where the axis of rotation of the antenna pierces the plane of Figure 17 and if, in the original system, the coordinates of the point 17 are $y=m$ and $z=n$, the equation of the family of hyperboloids becomes:

$$S=x^2+(y+m)^2+(z+n)^2-[\nu(y+m)-d-K\lambda]^2=0 \quad (9)$$

$$\frac{\delta S}{\delta x}=2x \quad \frac{\delta S}{\delta y}=2(y+m)-2\nu(\nu y+\nu m-d-K\lambda)$$

$$\frac{\delta S}{\delta z}=2(z+n)$$

P of Equation 5 is here represented by $d+K\lambda$ and it is independent on $\theta$. In Equation 6

$$\frac{\delta P}{\delta \theta}=0$$

and also $r=0$.

Then, Equation 6 becomes:

$$\nu^2 yz+ny+[(\nu^2-1)m-\nu(d+K\lambda)]z=0 \quad (10)$$

which represents a family of equilateral hyperbolae (for $n\neq 0$) all passing through the point 17 ($y=z=0$) and all having as their asymptote the straight line given by the equation:

$$z=-\frac{n}{\nu^2}$$

In the case of Fig. 17, it has been assumed that $$n=0$$

then Equation 10 becomes:

$$\nu^2 yz+[(\nu^2-1)m-\nu(d+K\lambda)]z=0$$

which resolves into $$z=0 \text{ (worthless)}$$

and $$y=-\frac{(\nu^2-1)m-\nu(d+K\lambda)}{\nu^2}$$

represented by straight lines such as 321—325.

The locus of the points of intersection 341—345 of meridian hyperbolae 301—305 with the stationary characteristic hyperbolae will be obtained by eliminating $K\lambda+d$ between Equations 9 and 10. It will be found:

$$\nu^2 z^2[(y+m)^2+(z+n)^2]=(mz-ny)^2$$

and, if returning to coordinates originating in 7:

$$\nu^2(z-n)^2(y^2+z^2)=(mz-ny)^2 \quad (11)$$

which is the equation of a curve of the fourth order having a double point in 7 and a double point in 17. In the case of Fig. 17 ($n=0$), this curve degenerates into $$y^2+z^2=\frac{m^2}{\nu^2}$$

which is a circle 320 having 7 at its center but which does not pass through point 17 as does circle 220 of Fig. 3.

The refractor grating antenna is constituted by portions of a material of refractive index $\nu$ which are limited in front by narrow partial surfaces cut out in the hyperboloids 301—305 along characteristic stationary lines 321—325.

These portions are limited rearwardly by planes 321a, 323a, 325a and internally by cylinders 321b and 323b.

Only the bounding surfaces toward the front, which are portions of a hyperboloid, have a predetermined structure in accordance with the invention. In Fig. 17, in order to have individual rings of a material of refractive index $\nu$ which do not penetrate one another, there have been used, as surfaces in front of the rings, only small portions cut out on the hyperboloids 301, 303 and 305 along characteristic lines 321, 323, and 325. But it would be possible to continue to have separate rings by using, as surfaces in front of the rings, small narrower portions cut out on each of the hyperboloids 301, 302, 303, 304, 305.

The rearward surfaces of limitation are planes which do not intervene in the phenomenon of focusing and whose position is not defined in accordance with the principles of the present invention. The planes 321a, 323a, 325a, involve a second refraction for the radiation rays already refracted by hyperboloid portions 301, 303, 305 but as the rays are parallel after the first refraction, they remain parallel after the second refraction. However, in order to have the radiation rays, having undergone this second refraction, cophasal, the distance $h$ between planes 321a and 323a or between planes 323a and 325a must be equal to $$\frac{k\lambda}{\nu-1}$$

wherein $k$ is an integer.

The antennae according to the invention as described above permit angular scanning of a sharp radiation beam of constant angle by restricting the necessary mechanical displacement solely to a light weight primary radiator such as a slot antenna, a single dipole or, in a more general way, a light weight radiation device, whereas the remainder of the radiating system, which is heavy and bulky on account of its large dimensions and which therefore cannot oscillate at a high frequency, remains fixed.

What I claim is:

1. A device for projecting a constant angle scanning beam of radiant energy of a given frequency comprising a movable primary driven radiator having a small oscillatory motion along a trajectory and about a center and a fixed focusing arrangement having said trajectory as a linear focus and comprising grating components constituted by a plurality of narrow surface portions each cut within a distinct surface of a family of focusing surfaces of revolution having a common focus located upon said trajectory, a common revolution axis, mutual distances between their vertexes equal to integral multiples of the half-wavelength of the wave radiated by said primary radiator and adapted to give rise to common emergent equiphase wavefronts, said surface portions being cut along the locus of the feet of the perpendiculars let fall from said trajectory center onto the focusing surfaces of the family.

2. A device for projecting a constant angle scanning beam according to claim 1 in which the focusing surfaces of revolution are reflecting surfaces.

3. A device for projecting a constant angle scanning beam according to claim 1 in which the focusing surfaces of revolution are refracting surfaces.

4. A device for projecting a constant angle scanning beam of radiant energy of a given frequency comprising a movable primary driven radiator having a small oscillatory motion along an arc of a circle and a fixed reflecting arrangement having said arc of a circle as a linear focus and comprising grating components constituted by a plurality of narrow surface portions each cut within a distinct paraboloid of a family of reflecting paraboloids having a common focus located upon said arc of circle, a common principal axis, mutual distances between their vertexes equal to integral multiples of the half-wavelength of the wave radiated by said primary radiator and adapted to give rise to common reflected equiphase wavefronts, said paraboloid portions being cut along the locus of the feet of the perpendiculars let fall from said arc of a circle center onto the reflecting paraboloids of the family.

5. A device for projecting a constant angle scanning beam of radiant energy of a given frequency comprising a movable primary driven radiator having a small oscillatory motion along an arc of a circle and a fixed reflecting arrangement having said arc of a circle as a linear focus and comprising grating components constituted by a plurality of narrow surface portions each cut within a distinct paraboloid of a family of reflecting paraboloids having a common focus located upon said arc of a circle, a common principal axis passing through the circle of said arc of a circle, mutual distances between their vertexes equal to integral multiples of the half-wavelength of the wave radiated by said primary radiator and adapted to give rise to common reflected equiphase wavefronts, said paraboloid portions being cut along the circles which are the loci of the feet of the perpendiculars let fall from said arc of a circle center located upon the common principal axis onto the reflecting paraboloids of the family.

6. A device for projecting a constant angle scanning beam of radiant energy of a given frequency comprising a movable primary driven radiator having a small oscillatory motion along an arc of a circle and a fixed reflecting arrangement having said arc of a circle as a linear focus and comprising grating components constituted by a plurality of narrow surface portions each cut within a distinct parabolic cylinder of a family of reflecting parabolic cylinders having a common focal line perpendicular to the plane of said arc of a circle, a common plane of symmetry, mutual distances between their vertex lines equal to integral multiples of the half-wavelength of the wave radiated by said primary radiator and adapted to give to common reflected equiphase wavefronts, said parabolic cylinder portions being cut along the straight lines which are the loci of the feet of the perpendiculars let fall from said arc of a circle axis onto the reflecting parabolic cylinders of the family.

GUERRIC DE PILLOT DE COLIGNY.

References Cited in the file of this patent

UNITED STATES PATENTS

| Number | Name | Date |
|---|---|---|
| 2,421,988 | Brown | June 10, 1947 |
| 2,423,648 | Hamsell | July 8, 1947 |
| 2,436,408 | Tawney | Feb. 24, 1948 |
| 2,495,219 | Beck | Jan. 24, 1950 |
| 2,541,806 | Brown | Feb. 13, 1951 |
| 2,547,416 | Skellett | Apr. 3, 1951 |